Patented Oct. 27, 1925.

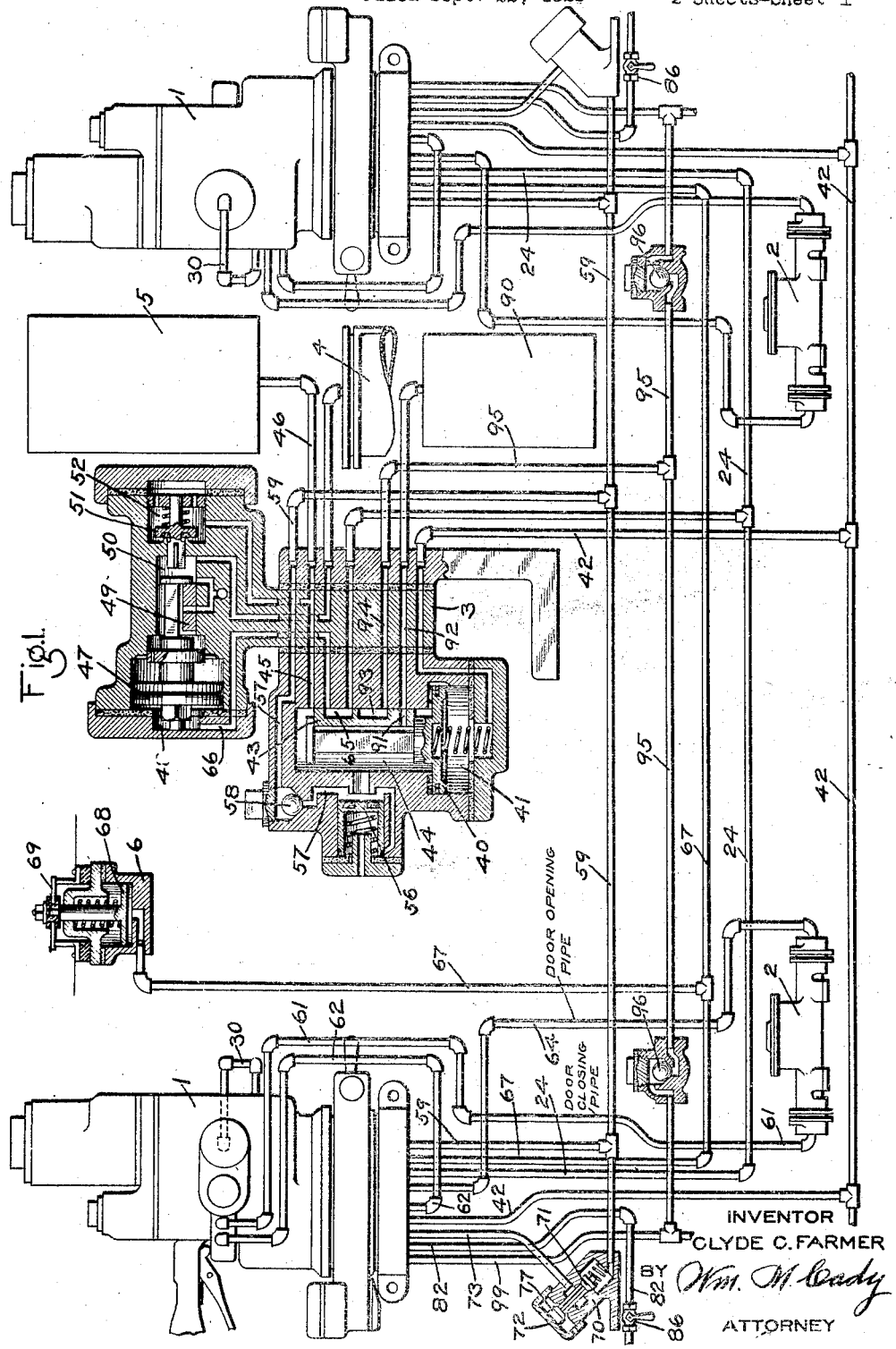

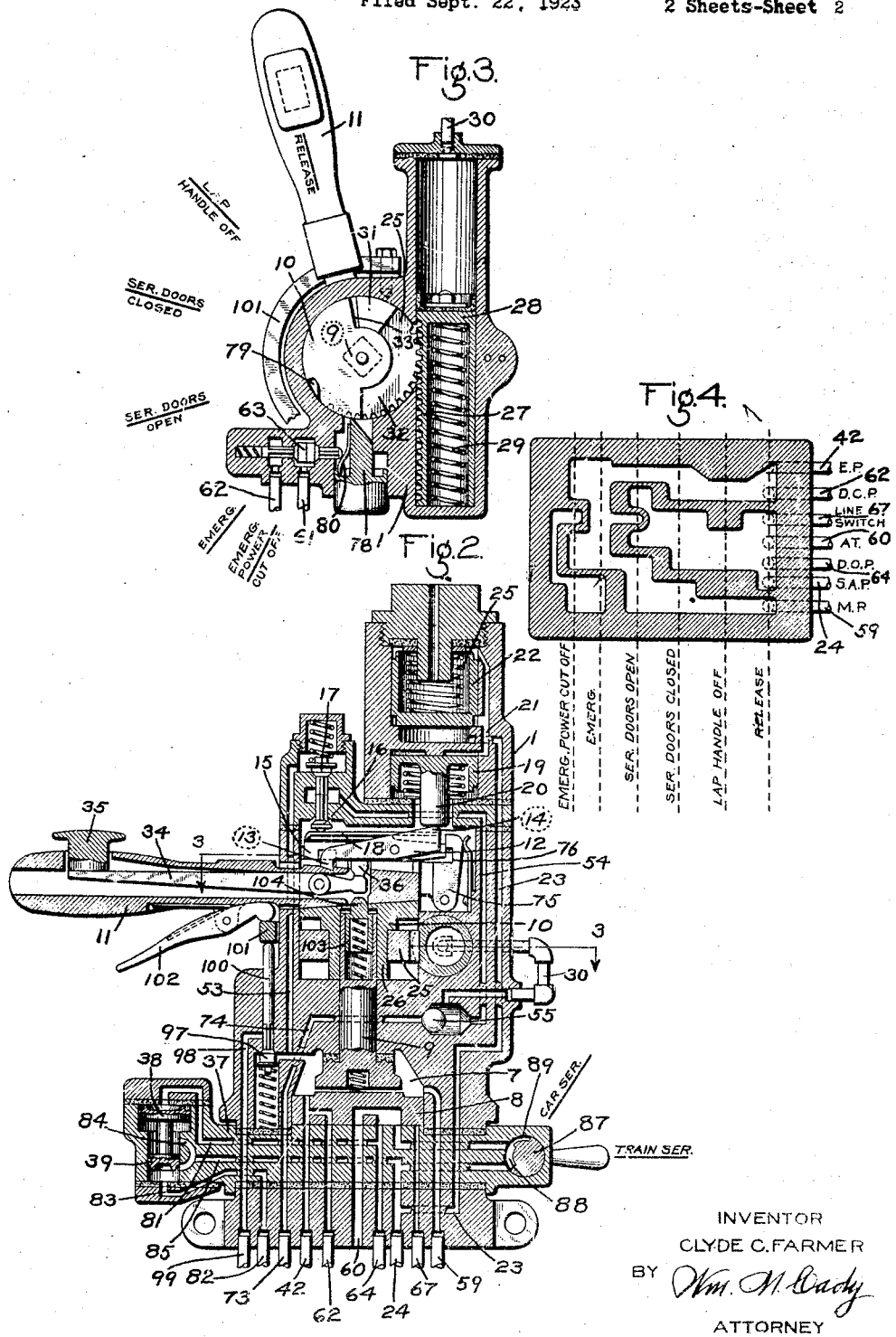

1,558,600

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR CONTROL EQUIPMENT.

Application filed September 22, 1923. Serial No. 664,232.

To all whom it may concern:

Be it known that I, CLYDE C. FARMER, a citizen of the United States, residing at Pittsburgh, in the county of Allegheny and State of Pennsylvania, have invented new and useful Improvements in Safety Car Control Equipments, of which the following is a specification.

This invention relates to air brake, car door, and safety car control equipments.

One object of my invention is to provide an improved equipment of the above character, in which the safety features and the control of the car doors are associated with the brake valve device, so that the control of the safety features by the electric controller handle is done away with, permitting the installation of air brake and safety car control equipments on cars, regardless of the type of electric controller which may be employed.

Other objects and advantages will appear in the following more detailed description of the invention.

In the accompanying drawings; Fig. 1 is a diagrammatic view, partly in section, of an air brake and safety car control equipment embodying my invention; Fig. 2 a central sectional view of the combined brake valve and safety control device employed in the equipment shown in Fig. 1; Fig. 3 a section on the line 3—3 of Fig. 2; and Fig. 4 a diagrammatic development of the brake valve, to show the air connections made in the various positions of the rotary valve of the brake valve device.

The equipment illustrated in the drawing is of the double end type having a combined brake valve and safety control device 1 at each end of the car and a door engine 2 of the usual construction controlled by each brake valve device for operating the car doors at the corresponding end of the car.

There is also provided an emergency valve device 3, a brake cylinder 4, a main reservoir 5, normally charged with fluid under pressure, and a pneumatically controlled power cut off device 6.

As shown more particularly in Figs. 2 and 3, the combined brake valve and safety control device 1 may comprise a casing having a valve chamber 7 containing a rotary slide valve 8 of the usual brake valve type and having an operating key stem 9. The stem 9 is squared to receive a handle socket member 10 and said handle socket member is adapted to receive a removable brake valve handle 11, so that when the handle is positioned in the socket member, the valve 8 may be rotated to its different operating positions.

When in position in the socket member, the handle 11 is locked against removal by the operation of a pivoted latch lever comprising side members 12 connected by cross bars 13 and 14. The cross bar 13 serves as a latch to engage in a notch formed in the handle 11 and mounted between the side members 12 is a pivoted lever 15 adapted to operate double beat valves 16 and 17. A flat spring 18 is interposed between the valve 16 and the lever 15 and the opposite end of the spring is secured to the under face of the cross bar 14.

The latch lever 12 is adapted to be operated to release the handle 11 only when a service application of the brakes has been made and for this purpose a piston 19 is provided having a stem 20 adapted to engage one end of lever 12.

Fluid under pressure is supplied to piston 19 through a port 21 controlled by a valve piston 22. A passage 23 communicating with the straight air pipe 24 leads to the under face of valve piston 22 and when the pressure in the straight air pipe has been increased to a degree slightly exceeding the pressure of coil spring 25, the valve piston is operated to admit fluid under pressure to piston 19.

One of the safety features of the equipment consists in providing means for shifting the brake valve handle to emergency position to effect an emergency application of the brakes and cut off the power when the operator releases the brake valve handle, and for this purpose there is provided a gear segment 25 mounted to rotate on the sleeve portion 26 of the handle socket member 10. The teeth of the gear segment mesh with the teeth of a gear rack 27 movable by the operation of a piston 28. The piston 28 is subject on one side to the pressure of a coil spring 29 and fluid under pressure is supplied to the chamber at the opposite side of the piston through a pipe 30. Projecting upwardly from the gear segment 25 is a lug 31 which operates in a recess 32 formed in the socket member 10, so that when the piston 28 is maintained in the position shown in Fig. 3, the brake valve handle 11 may be moved by the operator to the different operating positions without interference. When the piston 28 is shifted to its opposite position by the spring 29, the lug 31 engages shoulder 33 and operates to rotate the brake valve handle to emergency position with power cut off.

In the brake valve handle 11 is pivotally mounted a lever 34 having a push button 35 at one end which extends through an opening in the handle 11 and having the opposite end of the lever arranged to engage a downwardly projecting tappet 36 carried by the lever 15. When the handle 11 is grasped, the push button 35 is depressed and the lever 34 is rocked so that the valve lever 15 is elevated to close valve 16 and open valve 17.

Interposed in the brake valve casing 1 is a filling piece 37 which contains a straight air pipe cut off valve device comprising a piston 38 and a valve 39 operable by said piston for controlling communication through the straight air pipe under certain conditions.

The emergency valve device 3 may comprise an emergency valve portion and an application portion. The emergency valve portion comprises a piston 40 contained in piston chamber 41 which is connected to the automatic brake pipe 42 and a slide valve 43 contained in valve chamber 44 which is connected through passage 45 and pipe 46 with the main reservoir 5. The application portion comprises a piston 47 contained in piston chamber 48, a release slide valve 49 contained in valve chamber 50, and an application or supply valve 51, contained in valve chamber 52.

In operation, the operator normally grasps the brake valve handle 11, so as to depress the button 35 and cause the lever 34 to elevate the valve lever 15. The valve 16 is thus held closed and the valve 17 is held open and as a consequence, fluid under pressure is supplied to the piston 28 from rotary valve chamber 7, through passage 53, past the open valve 17 to passage 54 and the fluid pressure forcing the check valve 55 to the left, as shown in Fig. 2, fluid flows through pipe 30 to piston 28.

Said piston is then maintained in the position shown in Fig. 3 by fluid pressure and the brake valve handle 11 may be manipulated by the operator as desired.

In charging up the equipment with fluid under pressure, fluid flows from the main reservoir 5 through pipe 46 and passage 45 to valve chamber 44 of the emergency valve device and acts on the exposed face of the valve piston 56. When the pressure in the main reservoir exceeds a predetermined degree, the valve piston 56 is lifted from its seat, opening communication from the valve chamber 44 to a passage 57 containing check valve 58. Fluid then flows through passage 57 to main reservoir pipe 59 which opens to rotary valve chamber 7 of the brake valve device.

When the brake valve handle is held in release position, the straight air pipe 24 is connected through a cavity in the rotary valve 8 with exhaust port 60, as shown in Fig. 4. The brake pipe 42 is connected to the rotary valve chamber 7 so that same is charged with fluid under pressure.

The door closing pipe 61 is connected to pipe 62 when double beat valve 63 is in the normal position, as shown in Fig. 3, and since pipe 62 is connected to rotary valve chamber 7 in release position, the door closing side of the door engine 2 is supplied with fluid under pressure to hold the car doors closed, the door opening side of the engine being open through pipe 64 to exhaust port 60.

In the service doors closed position, the straight air pipe 24 is connected to the rotary valve chamber 7, so that fluid is supplied from the main reservoir to the straight air pipe. Fluid in the straight air pipe then flows through cavity 65 in emergency slide valve 43 to passage 66 and application piston chamber 48. The application piston is thereupon shifted to the right, so as to close the brake cylinder exhaust ports controlled by slide valve 49 and open the supply valve 51. Fluid from the main valve 5 is then supplied to the brake cylinder 4 to effect a straight air application of the brakes.

In this position, the communication to the door engine remains the same as in release position so that the car doors are held closed. If it is desired to apply the brakes and open the car doors, the brake valve handle is turned to service doors open position, in which the door closing pipe 62 is connected to the exhaust port 60 and the door opening pipe 64 is connected to the rotary valve chamber, thus admitting fluid to the door open side of the door engine to effect the opening of the car doors.

If the operator should release the brake valve handle, the valve lever 15 will move downwardly, permitting the valve 17 to close and the valve 16 to open so that fluid is vented from piston 28 through passage 54 past valve 16 to the atmosphere. The spring 29 then operates to shift the piston 28 and the rack 27 so as to cause rotation of the gear segment 32 in a counterclockwise direction. The lug 31 engaging the shoulder 33 then effects the rotation of the handle socket member 10 and the rotary valve 8 to emergency power cut-off position. In this position the emergency brake pipe 42 is vented to the atmosphere and the reduction in brake pipe pressure effects the movement of the emergency piston 40 to emergency position in which passage 66 is connected to valve chamber 44, so that fluid from the main reservoir is supplied to piston chamber 48. The application piston 47 is then shifted to the right so as to open the valve 51 and supply fluid to the brake cylinder 4 to effect an emergency application of the brakes.

In this position the door closing pipe 62 as well as the door opening pipe 64 are connected to the exhaust, so that the door engine 2 is balanced, permitting the car doors to be opened by hand as desired.

When in this position, fluid under pressure is supplied from the rotary valve chamber 7 to a line switch pipe 67 through which fluid is supplied to a switch piston 68 in the power cut-off device 6, said piston being operatively connected to a switch 69.

The switch 69 controls the opening of the power circuit either directly or indirectly, so that when fluid under pressure is supplied to piston 68, the opening of switch 69 effects the opening of the power circuit to the car motors.

In the service door open position, as will be seen from the diagram, Fig. 4, the line switch pipe 67 is supplied with fluid under pressure from the main reservoir, so that in this position, as well as emergency position, the power circuit is opened. Consequently, if the operator should leave the car to replace the trolley wheel with the brake valve handle in service door open position, and should neglect to place the controller handle in off position, the car will not be started when the trolley wheel is replaced, since the power circuit will remain open, so long as the brake valve handle remains in service door open position.

In order to permit the operator to remove his hand from the brake valve handle without causing an emergency application of the brakes, a foot controlled valve device is provided comprising a casing 70 containing a valve 71 adapted to be operated by a foot controlled push button 72. When the push button 72 is depressed by the foot, fluid under pressure is supplied from the main reservoir pipe 59, past the valve 71 to pipe 73 which leads to passage 74 in the brake valve casing 1. Fluid supplied to passage 74 shifts the ball check valve 55 to the right, so that communication is established from passage 74 to pipe 30 and thence fluid flows to piston 28, so that said piston is maintained in its position as shown in Fig. 3, even though the valve 16 is opened by the release of the brake valve handle 11, the escape of fluid through passage 54 past the open valve 16 being prevented by the seating of check valve 55 at the right.

In order to prevent removal of the brake valve handle, as when changing ends, without first applying the brakes, the locking lever 12 is provided and in order to release the locking lever from engagement with the handle 11, it is necessary to move the brake valve handle to service door closed position, so as to charge the straight air pipe 24 with fluid under pressure. Fluid supplied to the straight air pipe to effect an application of the brakes also flows through passage 23 to the under face of valve piston 22 and when the pressure in the straight air pipe has been increased to a predetermined degree, slightly exceeding the resistance of spring 25, the valve piston 22 is lifted from its seat, permitting flow of fluid to the face of piston 19. Said piston is then operated to shift the locking lever 12 so as to release the handle 11 and then upon moving the handle to handle off position, the handle may be removed.

The movement of lever 12 also causes the cross bar 13 of said lever 12 to engage and move the valve lever 15 so as to close valve 16 and open valve 17. The opening of valve 16 operates, as hereinbefore described, to admit fluid under pressure to piston 28 so that the emergency operation of said piston is prevented. When the handle 11 is removed, a locking latch member 75 is permitted to follow up the handle, so that a notch 76 in said member engages the end of lever 15 and holds same in its position with valve 16 closed and valve 17 open, so long as the brake valve handle remains removed.

If the equipment is being operated with the hand removed from the brake valve handle and the foot applied to the push button 72 and then the foot should also be removed from the foot push button, an emergency application will be immediately effected, since the valve 71 will then close and valve 77 will open, so that the pressure being released from passage 74, the ball check valve 55 will shift to the left, permitting pipe 30 to be connected to passage 54 and thus allowing fluid to escape from piston 28 past the open valve 17 to the atmosphere. The rack 27 is then operated, as before described, to shift the brake valve parts to emergency position.

If the operator wishes to leave the car, he may do so without causing an emergency application of the brakes, which may not be desirable, since in emergency position, sand is supplied for sanding the rails, so that sand, as well as fluid under pressure may be wasted when there is no necessity for sanding the rails.

For the above purpose, an additional manually operated device is provided comprising a manually operable locking pin 78 so disposed that the tapered end will engage a notch 79 formed in the handle socket member 10 when the handle 11 is moved to the service door closed position.

If it is desired to leave the car without causing an emergency application, the handle 11 is turned to service doors closed position and the locking pin 78 is manually pressed in to engage the notch 79. It will now be evident that although with the release of the handle 11, the rack 27 is operated and tends to rotate the member 10 to emergency position, such movement is prevented by the engagement of the pin 78 in the notch 79.

When the locking pin 78 is pushed in, a spring clip 80 acts on the double beat valve 63 so as to close communication from door closing pipe 61 to pipe 62 and open communication from pipe 61 to the atmosphere. This balances the fluid pressures on the door engine 2, so that the operator can manually open and close the car door as he leaves the car.

The operator might move the brake valve handle to service door open position so as to prevent an emergency application when he desires to leave the car, but it might be undesirable to leave the car door open, hence the above arrangement is provided by which the car door engine is balanced, so that the operator may open or close the car doors at will.

When trains of two or more cars are operated, means are provided so that while the operator on the motor car may apply the brakes on all the cars of the train he cannot release the brakes on the trailer cars unless the car doors of the trailer cars have been first closed.

Assuming that the brakes have been applied by the operator on the motor car and the train brought to a stop, the conductor on the trailer car may move the brake valve handle to service door open position so as to open the car doors on the trailer. A passage 81 leads from the door opening pipe and passage 64 to the upper side of piston 38, so that fluid pressure supplied to open the car doors on the trailer is also admitted to the top of piston 38. The brakes being applied by straight air, the straight air pressure passes through pipe 82 from the motor car to the trailer car and on the trailer car though passage 83 to the under face of valve 39. With piston 38 in its upper position, as shown in Fig. 2, fluid flows through groove 84 to passage 85 and thence to the straight air pipe 24 on the car.

The groove 84 permits flow of fluid from the pipe 82 around the valve 39 to the under side of piston 38 when said piston is in its upper position and piston 38 will remain in its upper position, unless the operator on the motor car attempts to release the brakes while the car doors are open on the trailer cars. When such attempt is made, the reduction in pressure in the straight air pipe 82 acting on the under side of piston 38 of the brake valve device on the trailer car permits the higher pressure supplied to the door opening pipe on the trailer car and acting on the upper face of piston 38, to shift said piston downwardly, thus causing the valve 39 to cut off communication from the straight air pipe 82, connected to the motor car, to the straight air pipe 24 on the trailer car, so that the pressure of fluid in the straight air pipe on the trailer car will not be reduced and thus the brakes on the trailer car will not be released.

When the conductor on the trailer car operates the brake valve handle to close the car doors, the pressure acting above the cut-off piston 38 is released and the operator on the motor car may then release the brakes on the trailer as well as on the motor car.

When operating a single car, the cut-off valves will not function. The straight air connections to the trailer cars are then closed by the usual cut-out cocks 86 disposed in the straight air pipe at opposite ends of the car.

A variable choke valve 87 may be provided in the filling piece 37, so that the rate of flow through the straight air pipe may be adjusted for a single car or for a train of two or more cars. In the train service position of the valve, as shown in Fig. 2. the flow from the rotary valve 8 through the straight air pipe is by way of the large cavity 88 in the valve 87, while in the car service position, the flow is by way of a restricted cavity 89 in the valve.

When an emergency application of the brakes is made, a communication is opened from a sanding reservoir 90, which is normally charged with fluid under pressure through port 91 in slide valve 43 and passage 92, through cavity 93 and passage 94 to pipe 95, the pipe 95 being connected to the usual sanding mechanism (not shown), by which sand is supplied for sanding the rails.

If the pressure in the main reservoir should fall below a predetermined degree, the valve piston 56 will move to its seat, cutting off communication from the main reservoir 5 to the main reservoir pipe line 59, so as to avoid undue loss of fluid from the main reservoir in case the main reservoir pipe should break.

A check valve 96 is arranged in the sanding pipe 95 near the brake valve device at each end of the car, so that when the sanding is effected by operation of the brake valve device, the check valve 96 will cut off flow to that portion of the sand pipe leading to the non-operating end of the car, thus preventing waste of air and ensuring prompt action of the sanding valve device.

For controlling the sanding of the rails from the brake valve device a valve 97 is provided in the casing 1 which controls communication from the rotary valve chamber 7, to a passage 98 which leads to sand pipe 99. The valve 97 has an upwardly extending stem 100 which engages a pivoted bail 101. For operating the bail 101 to depress the stem 100 and open the valve 97, a manually operable lever 102 is pivotally mounted on the brake valve handle 11, said lever being so disposed as to engage the bail 101 and depress same when the lever 102 is pressed toward the handle 11.

In order to hold the handle 11 in position in the socket member 26 when the latch 12 is thrown out of locking position, as where a straight air application of the brakes has been made, a yielding spring detent 103 may be provided. Said detent may be mounted in the hollow stem 9 of the valve 8 and is provided with a beveled latch portion 104 adapted to engage a corresponding opening formed in the handle 11. The latch portion is sufficiently beveled so that in the act of applying and removing the handle, the detent will be forced out of the way, but at the same time, the detent serves to hold the handle in position against accidental displacement when the latch 12 is released.

Having now described my invention, what I claim as new and desire to secure by Letters Patent, is:—

1. The combination with a brake valve handle having an emergency brake application position, of means acting on said handle only when the hand is removed from the brake valve handle for shifting said handle to emergency position, said means being rendered inactive when the handle is grasped.

2. The combination with a brake valve handle having an emergency brake application position, of means non-resistant to the movement of the handle when grasped by the hand and acting on said handle only when the hand is removed from the brake valve handle for shifting said handle to emergency position, and means operative in said emergency position to cut off power to the car motors.

3. The combination with a brake valve device having a brake valve handle movable to a position for effecting an emergency application of the brakes, of means operative to shift said handle to emergency position and mechanism associated with said handle and manually operable to supply fluid under pressure to said means to prevent the operation thereof.

4. The combination with a brake valve device having a brake valve handle movable to a position for effecting an emergency application of the brakes, of a spring, means operable by said spring for shifting said handle to emergency position, and manually operable mechanism for supplying fluid under pressure to said means to prevent the operation thereof and adapted upon release to vent fluid from said means and thereby permit the operation thereof.

5. The combination with a brake valve device having a brake valve handle movable to a position for effecting an emergency application of the brakes, of mechanism for rotating said handle, a spring acting on said mechanism and tending to rotate said handle to emergency position, and means controlled by said handle for admitting fluid under pressure to said mechanism to oppose the action of the spring.

6. The combination with a brake valve device having a brake valve handle movable to a position for effecting an emergency application of the brakes, of mechanism for rotating said handle, a spring acting on said mechanism and tending to rotate said handle to emergency position, means operable upon effecting a straight air application of the brakes for supplying fluid under pressure to said mechanism to repress the action of the spring, and foot operated means for also supplying fluid under pressure to said mechanism.

7. The combination with a brake valve device having a brake valve handle movable to a position for effecting an application of the brakes, of mechanism having a bias to shift said handle to emergency position and repressible by fluid under pressure, means operative upon grasping said handle for supplying fluid under pressure to said mechanism, means operative upon movement of said handle to a position for effecting a straight air application of the brakes for supplying fluid under pressure to said mechanism, and foot controlled means for also supplying fluid under pressure to said mechanism.

8. The combination with a brake valve device having a brake valve handle movable to a position for effecting an emergency application of the brakes, of mechanism having a bias to shift said handle to emergency position and manually controlled means for locking said handle in a position for effecting a straight air application of the brakes.

9. The combination with a brake valve device having a brake valve handle movable to a position for effecting an emergency application of the brakes, of mechanism having a bias to shift said handle to emergency position, a fluid pressure operated door engine, and manually controlled means for locking said handle in a position for effecting a straight air application of the brakes and for balancing the fluid pressures on said door engine.

10. The combination with a brake valve device having a brake valve handle movable to two positions for effecting an emergency application of the brakes, of means operable upon movement of said handle to one emergency position for effecting the opening of the power circuit of the car motor.

11. The combination with a brake valve device having a brake valve handle movable to two positions for effecting an emergency application of the brakes, of means operable upon movement of said handle to one emergency position but not the other for effecting the opening of the car motor power circuit.

12. The combination with a brake valve device having a brake valve handle movable to a position for effecting an emergency application of the brakes and to another position for effecting a service application of the brakes, of a switch device for controlling the power circuit and operable to open said circuit upon movement of said handle to either the emergency or the straight air application position.

13. The combination with a brake valve device having a brake valve handle movable to a position for effecting an emergency application of the brakes and to another position for effecting a service application of the brakes and for opening the car doors, of a switch device for controlling the power circuit and operable to open said circuit upon movement of said handle to either the emergency or the service application position.

14. The combination with a plurality of cars, each equipped with mechanism for controlling the brakes and the car doors, of means operative when the car doors are open on one car for preventing the release of the brakes on said car from another car.

15. The combination with a plurality of cars, each equipped with mechanism for controlling the brakes and the car doors, of means operative upon applying the brakes and opening the car doors on one car for preventing the release of the brakes on said car by manipulation of said mechanism on another car.

16. The combination with a plurality of cars, each equipped with mechanism for controlling the car doors and for applying and releasing the brakes throughout the train, of means operative upon applying the brakes and opening the car doors on one car for preventing the release of the brakes on said car from another car until the car doors have been closed on said car.

17. The combination with a plurality of cars, each equipped with mechanism for controlling the car doors and for applying and releasing the brakes, of a valve device subject to the opposing pressures of fluid supplied upon opening the car doors on one car and fluid supplied to the straight air pipe and operative upon a reduction in pressure in the straight air pipe initiated on another car for closing communication through the straight air pipe to the first mentioned car.

18. The combination with a brake valve device having a brake valve handle movable to a position for effecting an emergency application of the brakes, of mechanism biased to shift said handle to emergency position, valve means operative upon effecting a service application of the brakes for supplying fluid under pressure to said mechanism to suppress the operation thereof, and means for locking said valve means in the position for supplying fluid to said mechanism upon removal of the brake valve handle from the brake valve device.

19. The combination with a brake valve device having a brake valve handle movable to a position for effecting an emergency application of the brakes, of mechanism tending to shift said handle to emergency position, valve means operative upon movement of the brake valve handle to service application position for preventing the operation of said mechanism, and means for locking said valve means in its operative position upon removal of the brake valve handle from the brake valve device.

20. The combination with a brake valve handle, of mechanism operating upon release of the handle for shifting said handle to a predetermined position and means for preventing said mechanism from opposing movement of the handle by the hand.

21. The combination with a brake valve handle, of mechanism operating upon release of the handle for shifting said handle to a predetermined position and means for preventing said mechanism from resisting movement of the handle away from said position by the hand of the operator.

In testimony whereof I have hereunto set my hand.

CLYDE C. FARMER.